United States Patent [19]

Sabatino

[11] 3,912,544
[45] Oct. 14, 1975

[54] METHODS FOR MOUNTING BATTERY PLATES

[75] Inventor: Anthony Sabatino, St. Paul, Minn.

[73] Assignee: Gould, Inc., Chicago, Ill.

[22] Filed: Nov. 12, 1969

[21] Appl. No.: 875,781

[52] U.S. Cl............. 136/134 R; 136/176; 164/102; 164/109
[51] Int. Cl. .......................................... H01m 35/32
[58] Field of Search ...... 136/134, 176; 29/492, 495, 29/502, DIG. 46; 148/23; 117/DIG. 8; 134/1; 259/DIG. 43; 164/102–104, 109

[56] References Cited
UNITED STATES PATENTS

| | | | |
|---|---|---|---|
| 971,136 | 9/1910 | Monnot | 117/102 |
| 2,522,082 | 9/1950 | Arnold | 264/22 |
| 2,647,846 | 8/1953 | Bagno | 134/1 |
| 2,781,577 | 2/1957 | Smellie | 29/492 |
| 2,828,231 | 3/1958 | Henry | 134/1 |
| 2,896,649 | 7/1959 | Faidley | 259/DIG. 43 |
| 2,909,643 | 10/1959 | Graves | 219/85 X |
| 2,920,988 | 1/1960 | Bulat | 148/12.9 |
| 3,229,339 | 1/1966 | Sabatino et al. | 136/176 X |
| 3,238,579 | 3/1966 | Sabatino et al. | 136/176 X |
| 3,424,625 | 1/1969 | Tiegel | 148/23 |
| 3,652,337 | 3/1972 | Mix | 136/134 R |

Primary Examiner—Anthony Skapars

[57] ABSTRACT

Battery plates are mounted and aligned in jigs, dipped into a solder bath and then held in a mold while a lead strap or connecting bracket is cast therein and fused to the plates in one operation. When the lead solidifies the battery plates are firmly attached thereto. One variation involves dipping the plates in a flux solution before they are dipped in the solder bath. Other variations include subjecting the solder bath or the flux solution to ultrasonic vibrations to enhance the tinning or washing action.

5 Claims, 6 Drawing Figures

INVENTOR
ANTHONY SABATINO

BY Stryker & Jacobson
ATTORNEYS

METHODS FOR MOUNTING BATTERY PLATES

BACKGROUND OF THE INVENTION

In the battery art plates are mounted in a spaced relationship inside the battery and connected together by attaching the lugs of the plates to a lead strap or connecting bracket. It has been the practice to cast this strap from molten lead and inert the plates into the molten lead of the strap while it is cooling and solidifying. This method is generally referred to in the industry as a cast-on-strap process. This process has certain problems associated with it in that the chilling of the molten lead caused by dipping the plates into the strap and air induced surface oxides on the lugs result in poor quality fusion and a weak junction. My invention contemplates modifications to the process that yield an improved fusion between the plates and the strap.

SUMMARY OF THE INVENTION

Briefly, the present invention includes the additional step of dipping the lugs of the battery plates into a solder or molten lead alloy bath so as to tin the lugs and, thus, improve their fusion to the strap when they are cast onto the strap. One variation contemplated by the present invention includes another step in which the lugs of the plates are dipped in a flux solution before they are dipped in the solder or lead alloy bath. The flux operates to remove surface oxides from the plates and further increase the quality of the fusion. Another variation involves introducing ultrasonic vibrations to the flux solution or to the molten alloy or solder solution. The vibrations increase the efficiency of the coating action of the solutions on the plates when they are dipped. Thus, it is an object of my invention to provide an improved method of attaching battery plates to their lead straps or connecting brackets. Additional objects and advantages will become apparent to those skilled in the art from a study of the following drawing and description.

DESCRIPTION OF THE PREFERRED EMBODIMENT

Figure 1:
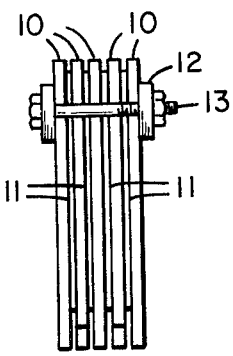
FIG. 1 and FIG. 2 show, respectively, edge and side views of the plates held and aligned in a stack by means of a jig.
Figure 2:
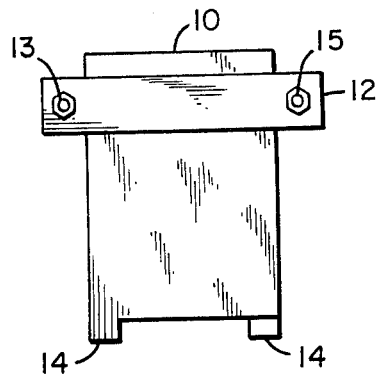

FIGS. 1 and 2 show five battery plates 10 and four insulating separators 11 mounted in a stack by means of suitable jigs or alignment frames 12 which are clamped together by a pair of pins 13 and 15. Although five plates are shown in the drawing the actual number of plates depends on the particular battery configuration. Such a stack of plates and separators is commonly referred to as an element in the battery art. Each of the plates 10 has a lug 14 extending from its lower end which lug comprises the contacting surface that is fastened to the connecting bracket or strap. It should be understood that lugs of of a different configuration could be used or no lugs at all and the term herein refers only to the part of the battery plates which is to be attached to the connecting strap. Frames 12 align and hold plates 10 and separators 11 and provide a means for dipping the lugs 14 of the plates 10 simultaneously into the various baths that constitute the process of the invention. As mentioned earlier, prior art battery plates have been mounted by holding them in a molten solidifying lead strap. This process often results in a poor fusing of the plates to the connecting strap due to the temperature differences involved. To increase the quality of the fusion between the plates and the mounting strap the present invention adds a third step as shown in FIG. 3.

Figure 3:
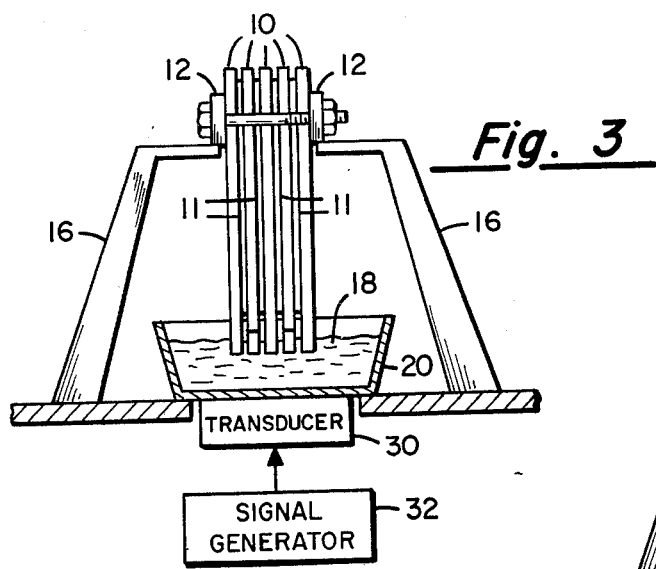
FIG. 3 shows the lugs of the aligned stack of plates dipped in a solution of solder or molten lead alloy.

In FIG. 3 frames 12 are supported by a pair of supports 16 so as to permit lugs 14 to be immersed in a molten bath of solder or lead alloy composition. This solder or molten lead composition is shown in FIG. 3 as a liquid bath 18 in a container 20. Bath 18 operates to tin and heat the surfaces of the lugs 14 so as to provide a better fusion when lugs 14 are cast onto the connecting strap as shown in FIG. 4.

Figure 5:
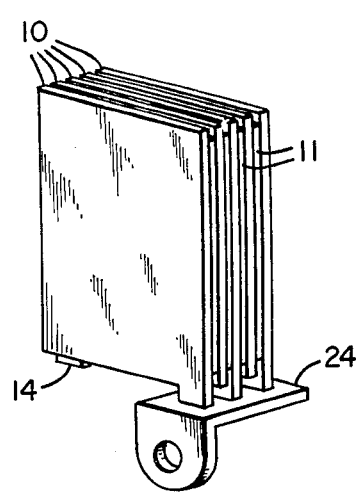
FIG. 5 is a perspective view of the finished product resulting from my invention.
Figure 4:
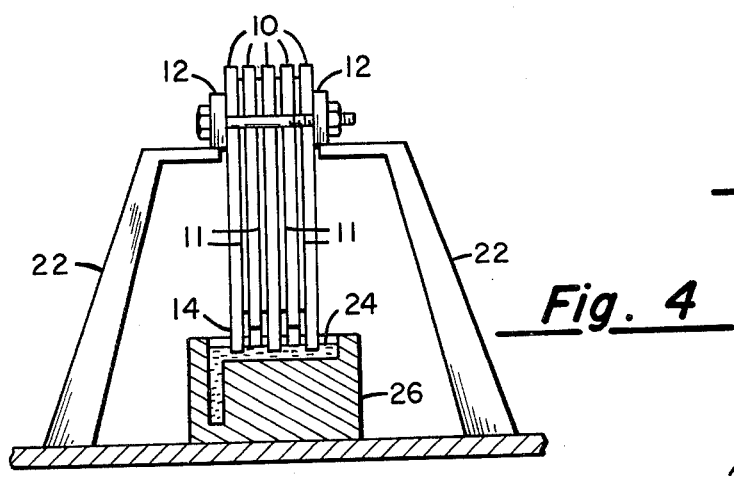
FIG. 4 shows how the aligned plates are positioned in the solidifying mounting strap.

In FIG. 4 a pair of supports 22 support frames 12 so that the lugs of the end plates and the center plate are in contact with the surface of a mass of molten lead 24 which is cooling in a mold 26. The other two plates have lugs on the opposite sides which either are outside mold 26 or dipped into a different mold so as to simultaneously cast on another strap to the alternate plate lugs. Only one casting operation is shown in FIG. 4 for clarity. As the molten lead 24 solidifies into a solid bracket 24, the lugs 14 fuse directly to the bracket 24. When the process is complete mold 26 and frames 12 are removed. The finished product is shown in FIG. 5.

A variation of the invention which has been found to further help the fusion process involves the addition of a transducer 30 to the bottom of container 20 as shown in FIG. 3. Transducer 30 is driven by a suitable ultrasonic signal generator 32 so as to introduce ultrasonic vibrations into the molten lead alloy bath 18. The ultrasonic vibrations produce forces that wash the surface of lugs 14 causing a better tinning action.

Figure 6:
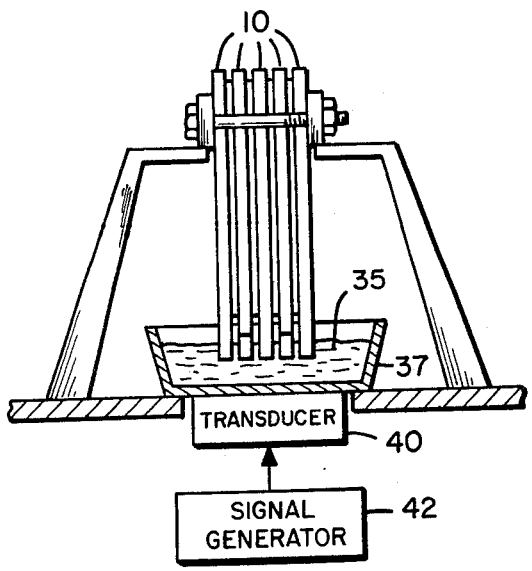
FIG. 6 demonstrates the additional step of dipping the plates into a flux solution.

Still further improvement may be obtained by adding the step shown in FIG. 6. In FIG. 6 lugs 14 on plates 10 are dipped into a flux solution 35 which is contained in a tray 37. The flux solution may be a mixture of hydrazine mono hydro-bromide in water and alcohol, an acid salt such as zinc chloride, an alcohol solution of resin, or any other suitable fluxing material well known to those skilled in the art. The flux solution treatment should take place immediately before the plates are dipped into the molten lead alloy or solder bath 18. It is important that the tinning step shown in FIG. 3 be carefully controlled in that it insures a clean active lead surface on lugs 14. The lugs 14 are held in the solder or lead alloy for a predetermined period of time sufficient to remove oxides. It has been found that a flux solution of molten salts or molten organic reducing materials such as abietic acid, stearic acid, or modified fatty acids provides a much superior fluxing action yielding even a better product. The latter flux solutions are much more reactive than those described earlier and permit superior fusion even with highly oxidized lugs.

As with the molten lead alloy bath, the fluxing action may be improved still more by the use of a transducer 40 and an appropriate signal generator 42 to introduce ultrasonic vibrations into the fluxing solution 35 thereby providing improved washing action on the lugs 14. In fact, the washing action of the ultrasonic waves in the flux solution increases the efficiency of the fluxing material to the point where it is possible to complete the process without the dipping step of FIG. 3. In that variation the plates need not be dipped in a solder or molten lead alloy bath. The plates with the cleaned lugs 14 may be carried directly to the casting station as shown in FIG. 4 and cast directly to the strap or supporting bracket 24. Thus, improved methods for preparing and casting battery plates to mounting or connecting straps have been shown with optional variations which should be limited only as defined by the appended claims.

I claim:

1. A process for casting battery plates onto a connection strap comprising the successive steps of:
   holding and aligning a stack of battery plates and separators;
   dipping the connecting lugs of said plates in said stack into a flux solution;
   dipping the connecting lugs of said plates in said stack into a solder bath;
   casting a connecting strap with molten lead;
   immediately immersing the connecting lugs of said plates into said molten lead after leaving said solder bath; and
   holding the stack in the immersed position until the lugs of said plates are cast onto the solidified connecting strap.

2. The process of claim 1 including the additional step of vibrating the flux solution during the flux dipping step so as to further help wash the plates.

3. A method of casting battery plates onto a connecting strap comprising the steps of:
   holding and aligning the battery plates with a temporary mounting means;
   dipping the connecting portions of said plates into a flux solution;
   dipping the connecting portions of the aligned plates into a molten lead alloy bath;
   removing the connecting portions of the plates from the lead alloy bath and immediately positioning said connecting portions of the plates in the surface of the connecting strap while the strap is being cast and is still molten; and holding said plates in position until the plates are cast onto the cooled solidified strap.

4. The method of claim 3 including the step of introducing ultrasonic vibrations into the molten alloy bath during immersion of the plates so as to further help wash and coat the plates.

5. The method of claim 4 including the step of introducing ultrasonic vibrations into the flux solution during immersion of the plates so as to further help wash the plates.

* * * * *